United States Patent
Hogan

(10) Patent No.: US 7,559,172 B2
(45) Date of Patent: Jul. 14, 2009

(54) FISHING LURE AND HOOK ASSEMBLY AND METHOD OF RIGGING SAME

(75) Inventor: Michael P. Hogan, Falmouth, MA (US)

(73) Assignee: Hogy Lure Company, Falmouth, MA (US)

( * ) Notice: Subject to any disclaimer, the term of this patent is extended or adjusted under 35 U.S.C. 154(b) by 0 days.

(21) Appl. No.: 11/528,085

(22) Filed: Sep. 27, 2006

(65) Prior Publication Data

US 2008/0072473 A1    Mar. 27, 2008

(51) Int. Cl.
*A01K 85/00* (2006.01)

(52) U.S. Cl. ............ 43/42.53; 43/4.5; 43/42.24; 43/42.41

(58) Field of Classification Search ........... 43/4.5, 43/42.37, 42.36, 42.24, 42.38, 42.08, 42.53, 43/42.41, 42.1
See application file for complete search history.

(56) References Cited

U.S. PATENT DOCUMENTS

| | | | | |
|---|---|---|---|---|
| 1,777,004 A | * | 9/1930 | Lemere et al. | 43/42.24 |
| 2,183,059 A | * | 12/1939 | Bacon | 43/42.03 |
| 2,316,048 A | * | 4/1943 | Clarke | 43/44.2 |
| 2,792,662 A | * | 5/1957 | Norton | 43/42.24 |
| 2,869,279 A | * | 1/1959 | Pretorius | 43/42.06 |
| 2,912,784 A | * | 11/1959 | Carlin | 43/42.17 |
| 2,979,850 A | * | 4/1961 | Lund | 43/42.24 |
| 3,046,689 A | * | 7/1962 | Woodley | 43/42.24 |
| 3,165,858 A | * | 1/1965 | Rutter | 43/42.53 |
| 3,344,549 A | * | 10/1967 | Peters | 43/42.11 |
| 3,429,066 A | * | 2/1969 | McClellan | 43/42.24 |
| 3,440,757 A | * | 4/1969 | McClellan | 43/42.24 |
| 3,505,755 A | * | 4/1970 | Pearce | 43/42.06 |
| 3,543,430 A | * | 12/1970 | Brokaw | 43/42.05 |
| 4,094,087 A | | 6/1978 | Carpenter | |
| 4,444,711 A | | 4/1984 | Schad | |
| 4,492,054 A | | 1/1985 | Barnhart | |
| 4,642,933 A | | 2/1987 | Brown | |
| 4,744,168 A | | 5/1988 | McClellan | |
| 4,875,305 A | | 10/1989 | Bridges | |
| 4,920,686 A | * | 5/1990 | McGahee et al. | 43/42.24 |
| 4,953,319 A | | 9/1990 | Kasper et al. | |
| 4,962,609 A | | 10/1990 | Walker | |

(Continued)

OTHER PUBLICATIONS

Pete Barrett, "Rigging Super Plastics Big Hooks & Big Baits for Stripers", The Fisherman, Jul. 6, 2006, pp. 14-15, vol. No. 27, New Jersey, Delaware Bay Edition, U.S. A.

*Primary Examiner*—Kurt Rowan
(74) *Attorney, Agent, or Firm*—Edwards Angell Palmer & Dodge LLP; Scott D. Wofsy

(57) ABSTRACT

An improved soft flexible fishing lure and a method of rigging same are provided by the present invention. More in particular, the invention provides a soft flexible fishing lure having an elongate lure body having a longitudinal axis, a top longitudinal surface, a bottom longitudinal surface, a left wall surface, a right wall surface, a head region forming the distal end, and a tail region forming the proximal end and a channel positioned along the longitudinal axis of the lure at the bottom longitudinal surface. The fishing lure of the invention is further provided with a tandem hook assembly that resides in part in the channel of the soft flexible lure body.

5 Claims, 3 Drawing Sheets

U.S. PATENT DOCUMENTS

| | | | |
|---|---|---|---|
| 4,976,060 A * | 12/1990 | Nienhuis | 43/42.41 |
| 5,018,297 A | 5/1991 | Kennedy, Jr. | |
| 5,063,703 A | 11/1991 | Riley | |
| 5,117,574 A * | 6/1992 | Perry | 43/42.36 |
| 5,142,811 A | 9/1992 | Freeman | |
| 5,170,579 A | 12/1992 | Hollinger | |
| 5,321,906 A | 6/1994 | Bommarito | |
| 5,517,781 A | 5/1996 | Paoletta, Jr. | |
| 5,887,379 A | 3/1999 | Lockhart | |
| 6,079,146 A | 6/2000 | Larsen | |
| 6,161,324 A | 12/2000 | Hugunin | |
| 6,182,391 B1 | 2/2001 | Hubbard | |
| 6,266,916 B1 * | 7/2001 | Dugan | 43/42.37 |
| 6,327,808 B1 | 12/2001 | Zascavage | |
| 6,794,440 B2 | 9/2004 | Chen | |
| 6,827,930 B2 | 12/2004 | Cobb et al. | |
| 6,895,711 B1 | 5/2005 | Nakamichi | |

* cited by examiner

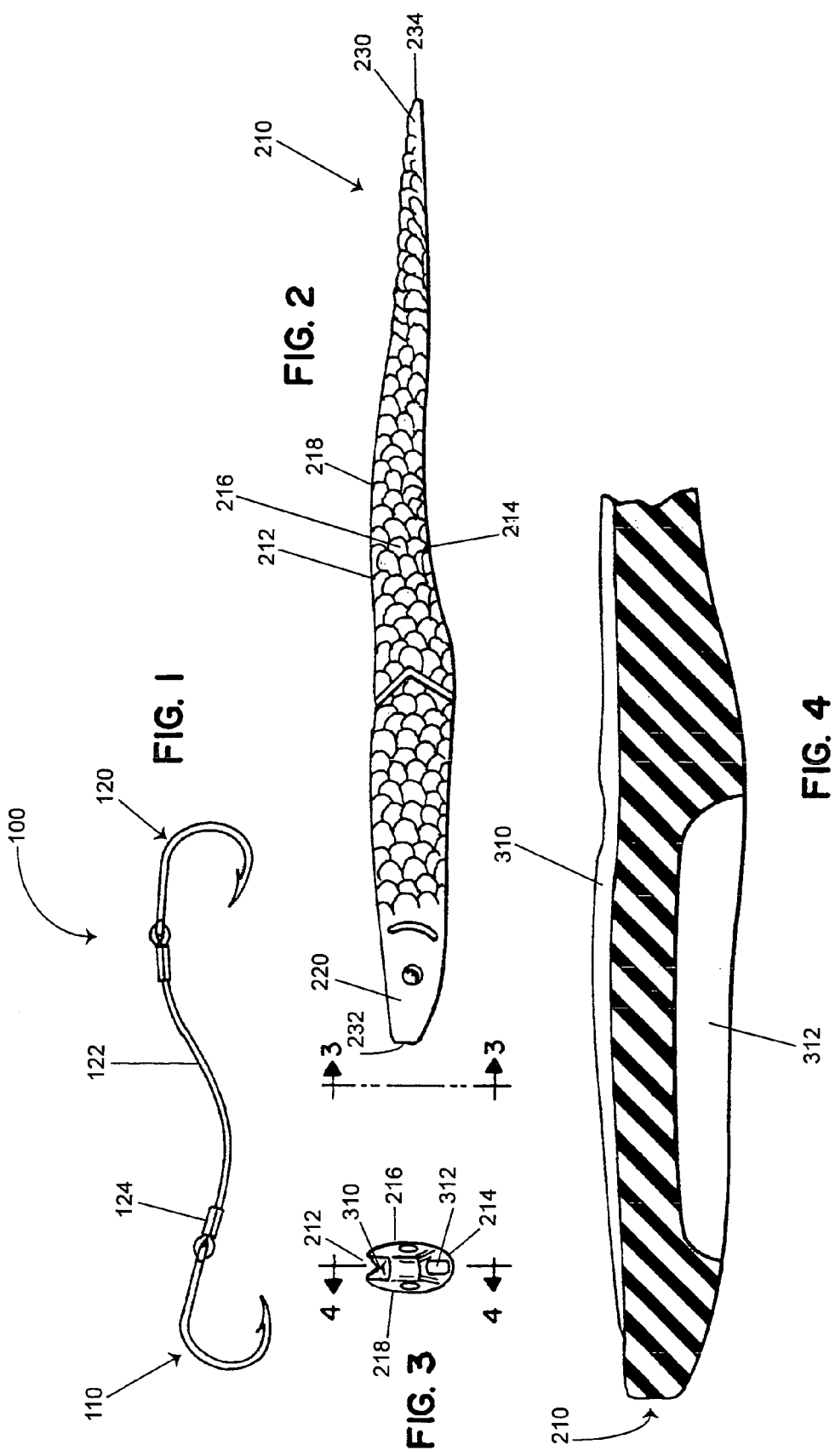

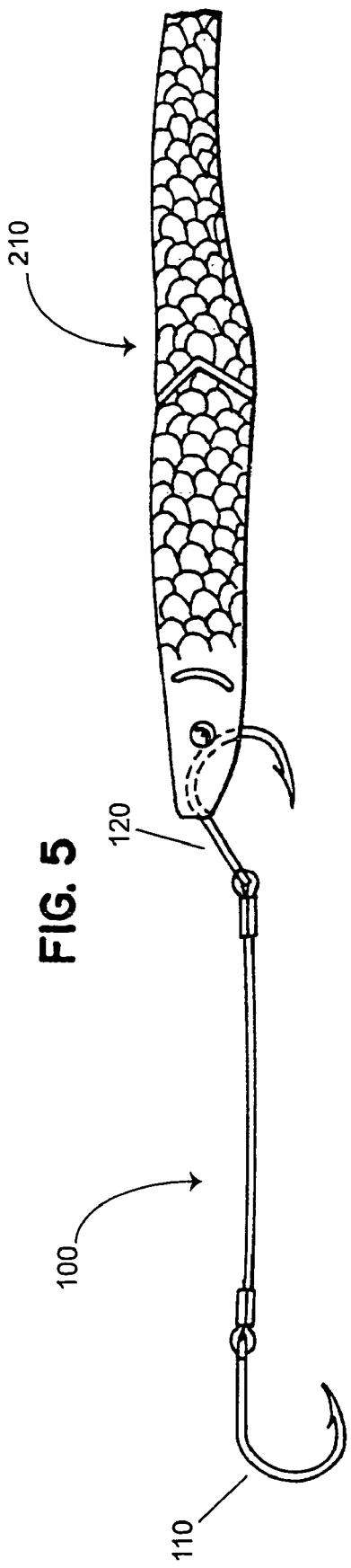
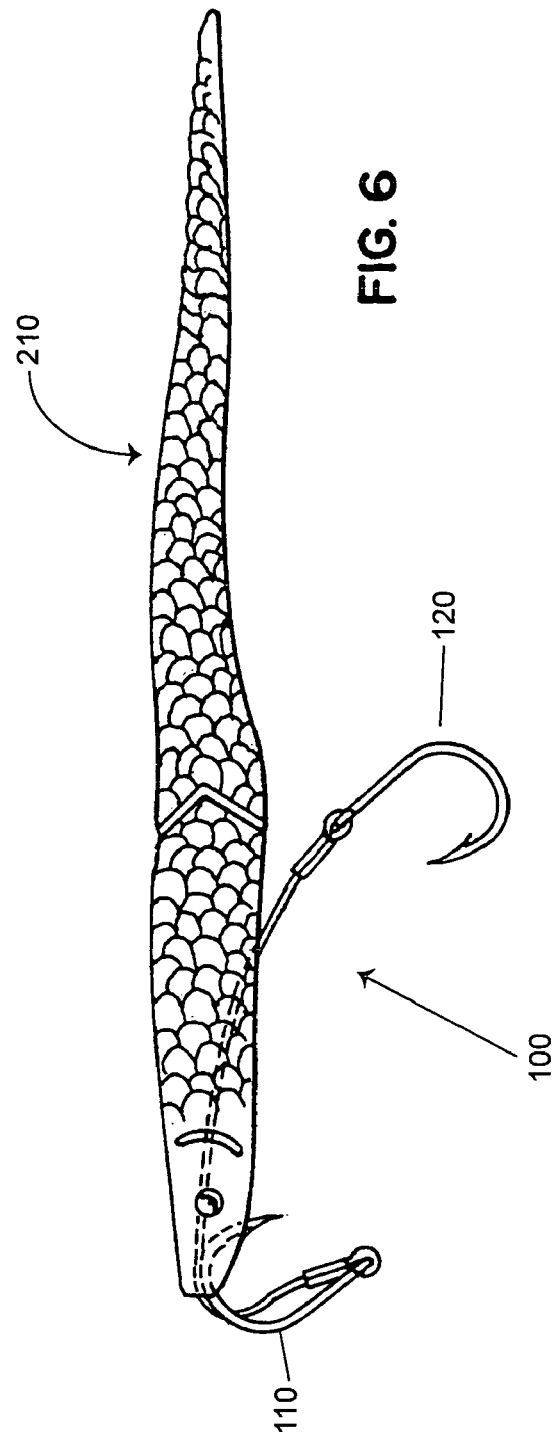

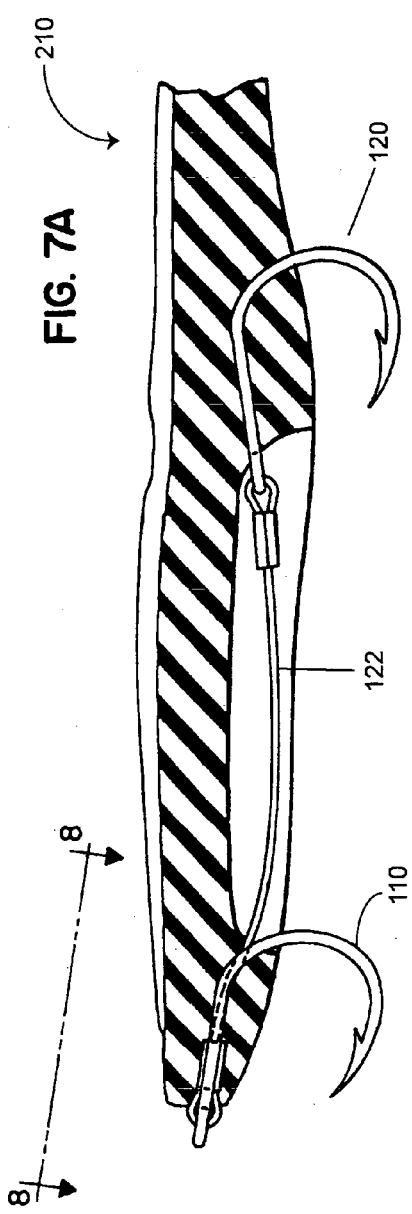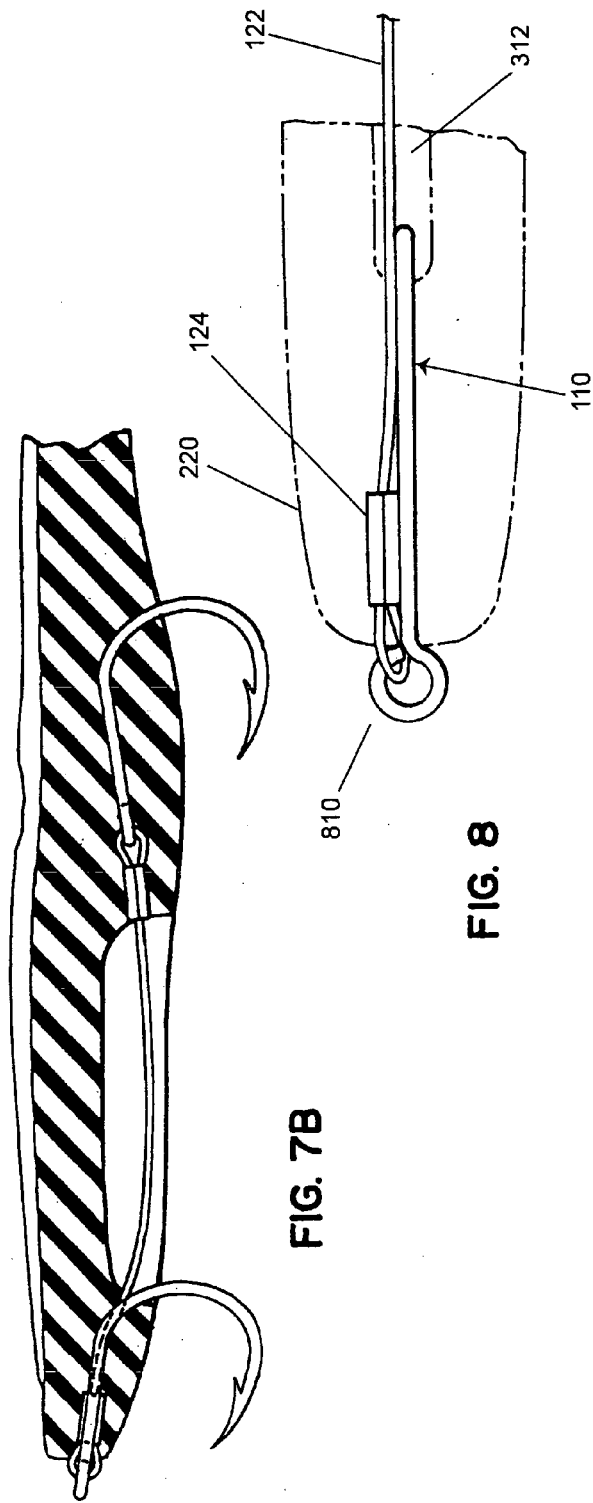

FISHING LURE AND HOOK ASSEMBLY AND METHOD OF RIGGING SAME

BACKGROUND OF THE INVENTION

1. Field of the Invention

The present invention relates to fishing lures, and in particular, to a soft plastic jerkbait lure comprising a tandem hook-rig assembly and a method of rigging same.

2. Description of the Related Art

The sport of fishing with artificial lures for game fish, such as large mouth bass, small mouth bass, pike, walleye, and a variety of saltwater game fish, such as, striped bass and bluefish, is a highly popularized sport. Much money is spent each year on a variety of equipment, lures, boats and other gear that is used and/or needed in fishing. The popularity of fishing is evidenced by numerous fishing-related publications, fishing-related television programming, fishing-related internet websites, products, and the popularity of amateur and professional tournaments.

A large variety of lures have been designed and manufactured to assist the catching of fish, such as bass, bluefish and tuna. These lures are made in a variety of shapes, sizes, colors, textures and weights and are made from a whole range of materials, from metals, to plastics and to soft plastics and rubbers. Indeed, the plethora of different lures known in the art are reflective of the great variety of different fishing applications and techniques that are available and utilized in the sport of fishing. The immense variety of these applications and techniques in turn reflect the great variety of target fish, weather conditions, water conditions (e.g. fresh water, salt water, stream water, estuary water, shallow or deep water), and geographical locations that may exist in any given fishing experience. For example, a fisherman interested in "pulling" bass may choose from variety of "topwater" and "subsurface" techniques and use a variety of available lures, including commonly known lures such as buzzbaits (e.g. the Squeaky Dolphin Buzz), walking baits (e.g. the Zara Spook, the Gilmore Oddball, the MirroLure Top Dog), poppers (e.g. Argoblast Hula Popper), propeller ripping bait (e.g. the Gilmore Jumper, the Gilmore Go Getter, the Hedden Bay Torpedo, and the Smithwick Devil's Horse), soft plastic jerk baits (e.g. the Lunker City Slug-Go, the Bass Assassin), and crankbaits (e.g. the Bill Lewis Rat-L-Trap and the Cordell Hot Spot).

It is generally appreciated to the skilled artisan that lures are used to catch fish by mimicking bait (living or dead organism) in shape, size, smell, sound, appearance and action. The closer the action and appearance of the lure to the actual bait it is imitating, the more effective lure will generally be at catching fish. The fishing lure industry is constantly refining and improving fishing lures to better mimic the shape, size, smell, sound, appearance, color and action of bait in order to allow fishermen to be successful. Sight and appearance play an important role, if not the most important role, in fish feeding habits, and fishermen are constantly seeking better and ever more effective lures.

One of the main areas of emphasis in recent years, especially in the area of bass fishing, has been the growing popularity of large soft plastic baits, also known as large soft jerk baits which reflects the technique typically used in fishing with such lures, i.e. propelling the lure with short jerking motions. These types of lures have become especially popular with many striped bass fisherman all over. However, the large soft jerk baits currently available in the art are at a significant disadvantage in that they are often time consuming, tedious and difficult to rig. As a result, such lures often lack consistency in how they are joined to a hook system. And, from the inconsistency stems fishing lures that do not "swim" or propel through the water in a proper manner. For example, an improperly rigged lure might be unable to swim straight, may spin undesirably, may swim in only one direction, or may be forced undesirably to the surface. Such problems result in the ineffectiveness of the lure, and in particular, the inability of the lure to catch the fish for which it is intended.

The large soft jerk lures currently in the art are typically configured with one or more hooks, and most typically are rigged to have one or two hooks. In most cases, a traditional worm hook is used to rig the lure. The rigging processes used on these known lures, however, are tedious and time consuming and lead, as mentioned above, to inconsistent and underperforming lures. For example, a large soft jerk lure having two hooks (a lead hook and a rear hook) is typically rigged by the steps including: (1) tying rear hook to fishing line, (2) threading fishing line through specially designed rigging needle, (3) running rigging needle through the center of the fishing lure, (4) pulling the line attached to the rear hook so that it enters the body of the fishing lure, (5) tying the lead hook to the running line using half hitches, (6) gluing the half hitches to the hook to prevent slipping, (7) drying the glue to cure, and (8) inserting the hook into the center of the fishing lure. Such known rigging processes can take upwards of ten minutes for each lure, a span of time which can easily represent a lost opportunity to a fisherman.

An additional point is that because of the nature of the currently used rigging process, the reusability of the lure components is limited. In particular, in a situation where the lure soft plastic body becomes ripped or torn due to natural wear and tear, a new hook system must be constructed "from scratch" according to the above steps since the securement of the old hook assembly with glue and ties effectively makes it too difficult to remove and reuse.

A further disadvantage of the currently available large soft jerk lures is their inconvenience. In particular, the tedious and difficult nature of the currently used rigging system makes it burdensome to construct new lures, especially while in the midst of an actual fishing trip. In particular, it is often very cumbersome to a fisherman to have to practice the above steps, including manipulating the adhesive, the sharp rigging needles and the performing the precise nature of the rigging steps while in the midst of a fishing excursion, e.g. dealing with unfavorable weather conditions, the motion of a boat, or lack of flat surfaces on a rocky shoreline.

Accordingly, an improved large soft jerk bait lure that cures the above drawbacks and disadvantages is desired and would be an advance in the art.

SUMMARY OF THE INVENTION

The purpose and advantages of the present invention will be set forth in and apparent from the description that follows. Additional advantages of the invention will be realized and attained by the methods and systems particularly pointed out in the written description and claims hereof, as well as from the appended drawings.

In one aspect, the present invention provides a soft flexible jerk fishing lure that avoids the limitations of the soft flexible lures known in the art by way of providing an improved fishing lure body, hook rigging assembly, and a method of rigging a fishing lure that is simpler, more convenient, and faster than the lures and methods of rigging same known in the art.

The present invention in another aspect provides an improved fishing lure body and method of rigging same that provides for a consistently-rigged fishing lure which will fish consistently and for a variety of different fish and fishing conditions.

In still another aspect, the present invention provides an improved fishing lure and method of rigging same that provides lures that lack unwanted swimming characteristics, such as, unwanted spinning and forced surface swimming.

Another aspect of the invention provides an improved large soft jerk lure that has reusable components, in particular, a reusable hook assembly.

Still a further aspect of the invention provides the opportunity for amateur fisherman to benefit from fishing with a soft plastic jerk lure, i.e. providing a lure that is easy to rig even for the inexperienced fisherman.

In one aspect, the present invention provides a fishing lure comprising a flexible elongate body having a longitudinal axis and a general fish-like form, said flexible elongate body comprising a top longitudinal surface, a bottom longitudinal surface, a left wall surface, a right wall surface, a head region forming the proximal end, and a tail region forming the distal end, said head and tail regions being longitudinally opposed. The fishing lure further comprises a first hook inserted into the flexible elongate body at the head region and a second hook inserted into flexible elongate body at a point distal to the head region, said first and second hook being flexibly connected by a flexible connector. The fishing lure also comprises a channel positioned along the longitudinal axis of the lure at the bottom longitudinal surface, said channel being adapted to accommodate the flexible connector. The first and second hooks are substantially inline with the longitudinal axis and have substantially the same orientation.

The present invention further relates to a method of rigging a fishing lure comprising the steps of obtaining a hook assembly comprising a first hook and a second hook, said hooks being connected together at their ends by a flexible connector. Next, a flexible elongate body having a longitudinal axis and a general fish-like form is obtained, said flexible elongate body comprising a top longitudinal surface, a bottom longitudinal surface, a left wall surface, a right wall surface, a head region forming the proximal end, and a tail region forming the distal end, said head and tail regions being longitudinally opposed. The second hook of the hook assembly is then inserted through the tip of the proximal end and fed out from the bottom longitudinal surface at a location that is in or substantially near the proximal end of the channel. Next, the first hook of the hook assembly is inserted through the tip of the proximal end and then fed partially out from the bottom longitudinal surface at a location that is in or substantially near the proximal end of the channel. The second hook is then inserted into the lure body through the distal end of the channel and then partially out from the bottom longitudinal surface at a location that is beyond the distal end of the channel. Lastly, the first and second hooks are adjusted such that they are in substantially the same orientation and the flexible connector traverses the channel.

In one embodiment, the flexible elongate body is comprised of a soft flexible polymer, such as, but not limited to a polystyrene, polyvinyl chloride, polyamide (or nylon), synthetic rubber, acrylic, polyethylene, polyfluorethylene, polypropylene, polyurethane, polyethylene terephthalate, polyester, dacron, terylene, plastisol or any combination thereof.

In still another aspect, the present invention provides a tandem hook assembly comprising a first hook, a second hook and a flexible connector that is coupled to the securement end (e.g. the hook eye) of the first hook and the securement end of the second hook such that the first and second hooks are longitudinally opposed.

In another embodiment, the first and second hooks of the fishing lures of the invention are arranged whereby their hook shanks are generally aligned with the longitudinal axis of the lure and the points of both the first and second hooks are facing towards the head portion.

In yet another aspect, the flexible elongate body of the inventive fishing lures further comprise at least one marking to indicate the location for placing the first or second hooks, or both.

In another embodiment, the present invention provides a method of rigging a fishing lure comprising the steps of: providing a hook assembly having a first hook and a second hook, said hooks being connected by a flexible connector; providing a flexible elongate body having a longitudinal axis, a distal end of the body, a proximal end of the body, and a bottom longitudinal surface having a channel; feeding the second hook through the distal end of the elongate body and out from the bottom longitudinal surface; advancing the second hook to draw a portion of the flexible connector through the distal end; feeding the first hook through the distal end of the elongate body and partially out from the bottom longitudinal surface; feeding the second hook through the elongate body and partially out from the bottom longitudinal surface at a location that is proximal to the first hook; wherein the flexible connector is positioned in the channel.

In one aspect, the step of providing a hook assembly further comprises the step of connecting the end of the first hook to the end of the second hook by a flexible connector.

It is to be understood that both the foregoing general description and the following detailed description are exemplary and are intended to provide further explanation of the invention claimed. It is also to be understood that features of each embodiment can be incorporated into other embodiments, and that optional features described in connection with one embodiment of a fishing lure in accordance with the invention can be incorporated into other embodiments of fishing lures in accordance with the invention.

The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF THE DRAWINGS

So that those having ordinary skill in the art to which the subject invention pertains will more readily understand how to make and use a soft plastic lure and the method of rigging same as described herein, preferred embodiments thereof will be described in detail herein below, with reference to the drawings, wherein:

FIG. 1 is an embodiment of the tandem hook assembly of the invention, comprising a lead hook and a rear hook. Each hook comprises a distal end (point end) and a proximal end (securement end). The hooks are joined together at their proximal ends by a flexible connector. The flexible connector is joined to each proximal end by a loop of the flexible connector fed through a hook eyelet at each hook proximal end and fastened by a crimp;

FIG. 2 is a side profile view of an embodiment of the elongate lure body in accordance with the invention, showing a head region (distal end), a dorsal side (top longitudinal surface), a ventral side (bottom longitudinal surface), a left wall surface, a right wall surface and a tail region (proximal end);

FIG. 3 is a front-end view of the head region along line 3-3 of FIG. 2. The figure shows a left wall surface, a right wall surface, dorsal side (top longitudinal surface), a ventral side (bottom longitudinal surface), an upper channel on the dorsal side and a lower channel on the ventral side or bottom longitudinal surface;

FIG. 4 is a partial cross-sectional view of an embodiment of the elongate lure body of the invention illustrating a head portion, a lower channel and an upper channel taken along line 4-4 of FIG. 3;

FIG. 5 is an operational view of the fishing lure in accordance with the invention showing the insertion of a rear hook of an embodiment of the tandem hook assembly into the head portion or distal end of the lure body;

FIG. 6 is an operational view of the fishing lure in accordance with the invention showing the insertion of a lead hook into the body of the lure which occurs after the rear hook is inserted and the flexible connector is substantially pulled through the point of insertion of the rear hook at the distal end;

FIG. 7A and FIG. 7B are partial cross-sectional views of fishing lure embodiments in accordance with the invention taken along line 4-4 of FIG. 3. These figures show the relative position and arrangement of the tandem hook assembly of the invention, including the flexible connector, and the lead and rear hooks with respect to the lure body and lower channel. FIG. 7A depicts an embodiment wherein the proximal end of the rear hook resides in the lower channel of the lure. FIG. 7B depicts an embodiment wherein the proximal end of the rear hook resides in the body of the lure; and FIG. 8 is an enlarged view of the head region taken along line 8-8 of FIG. 7A and FIG. 7B. This figure shows the placement of the lead hook in the head region of the lure. The hook eyelet of the lead hook extends from the tip of the head region out away from the plane of the lure. The lure can be joined to a fishing line by way of direct attachment to the lead hook eyelet. The flexible connector is shown to be aligned with the shank of the lead hook and the lower channel.

DETAILED DESCRIPTION OF PREFERRED EMBODIMENTS

The present invention provides improved soft flexible fishing lures that are easier to rig, provide superior and consistent performance, and are effective in catching many different kinds of fish, including especially, striped bass.

The fishing lures of the invention can comprise a lure body of any suitable form, shape, size, color, texture, or design, etc. The selection of such parameters will depend, inter alia, upon the type of fishing technique being used and the type of fish that one is attempting to catch. For example, the shape of the lure body can resemble a known fresh water or ocean creature, such as, for example, a fish, eel, worm, squid, lizard, crayfish. It is noted that to "resemble" such a creature does not require the lure body to mimic all the anatomical features of a given creature. For example, a lure body that generally resembles a fish is not required to comprise appendages such as the dorsal fin, pelvic fin, spine, fin ray, tail or caudal fin or pectoral fin. In embodiments wherein the lure is in the general shape of a fish, the general shape can reflect any known fish body type, such as, attenuate (tapering gradually to a point, e.g. spiny eel), compressed (a body that is flattened laterally (e.g. flounder), depressed (a body that is flattened dorsoventrally, i.e. from top to bottom (e.g. stingray, skate), fusiform (a spindle-shaped body, referring to the form of fishes that have a body that tapers at both ends (anterior and posterior) and slightly or not at all compressed (e.g. herring, mackerel, tuna), terete (a cylindrical body shape which usually tapers at the end (e.g. eelpout, lamprey) and truncate (cut square and having a flattened broad end (e.g. cowfish, sunfish). Accordingly, the shape of the present lures can essentially be reflective of any known type of fish, including the *Agnatha* (e.g. lamprey and hagfish), *Chondrichthyes* (sharks, skates and rays) and *Osteichthyes* (bony fish).

In a preferred aspect, the body of the lures of the invention are in the form of a fish having an elongate body, without appendages, and is tapered to a degree at the head region and/or the tail region (e.g. attenuate or fusiform in shape). Accordingly, no limitation is meant to be placed on the shape of the lure body so long as it is capable of attracting and/or catching the intended fish.

In another preferred aspect, the lure body is in the general form of an eel. In yet another preferred aspect, the lure body is in the general form of a herring.

In addition, the present invention contemplates a lure body having any suitable length and/or thickness. The fishing lure bodies of the invention are preferably 2-5 inches, 4-7 inches, 6-9 inches, 8-11 inches, 10-13 inches, 12-15 inches, 14-17 inches, 16-19 inches, or more. In preferred embodiments, the lure body is 7 inches, 10 inches, or 14 inches. The thickness of the lure can vary depending on the particular shape of the lure used.

The lure bodies of the fishing lures of the invention can include any suitable or preferred decoration, including a paint, a fluorescent paint, a pattern, a line, an image, a design, imitation scales, glitter, foil, or a marking. The decorations of the lure may aid the lure body in appearing more fish-like or which simply may impart a tendency of the lure to better attract a particular type of fish. A suitable decoration may also include any kind of appendage, such as a dangling piece of metal, shiny foil, or the like, which may assist in attraction of fish. Appendages that spin, shine, bubble, twirl or move erratically or move in particular ways that are enticing to fish are also contemplated by the present invention. No limitation is placed on how the fishing lures of the present invention may be "dressed up." A skilled artisan will appreciate the numerous manners by which to decorate a fishing lure in a way that may enhance a fish's attraction to the lure thereby making the lure more effective.

Accordingly, the fishing lures of the present invention are not limited with respect to the styling, e.g. color, glitter, foils, scales, lines, images, patterns, markings, appendages etc. For example, any color may be used, such as, for example, purple, blue, green, red, orange, yellow, black, amber, bone, etc. In particular aspects, the color of the lure body is black, bubble gum, bone, amber or purple.

The fishing lure bodies can also comprise markers, e.g. paint, divet, bump, embossed marking, stamp, sticker, stamping, etc., that mark the locations of the entry and/or exit points of the hooks of the invention and which provide assistance to the person rigging the lure in inserting the lure hook(s) in the proper locations.

In yet another aspect, the lure bodies of the fishing lures of the invention can be provided with a scent and/or attractant. The scents and/or attractants can be obtained from any natural or synthetic source so long as it achieves the objective of attracting fish or at least having the tendency or likelihood of attracting fish. It will be appreciated that fish scents and/or attractants are commonly provided as liquids or oils which produce an odor which attracts fish, or deceives fish into thinking the artificial fishing lure is actually live or dead bait.

In one aspect, the attractant may be an animal by-product. The animal by-product may be an aquatic animal by-product. In one aspect, the aquatic animal by-product is selected from the group consisting of shrimp, salmon, squid, shad, sardines, anchovies, crayfish, mullet, and pheromones. In a preferred embodiment, animal by-product attractant is capable of attracting striped bass.

In another aspect, the attractant may be a plant by-product. The plant by-product may be an aromatic plant by-product. In a further aspect, the aromatic plant by-product is selected from the group consisting of anise, garlic, banana oil, and pheromones. In a preferred embodiment, the plant-derived attractant is capable of attracting striped bass.

In a still further aspect, the attractant may be an organic or inorganic chemical, or a mixture thereof. The organic chemical may be one or more steroids, fats, fatty acids or a nitrogen containing organic chemical, or any combination thereof. In one aspect, the nitrogen containing organic chemical is selected from the group consisting of alkaloids, amino acids, peptides, quaternary ammonium compounds, proteins and pheromones. In a preferred aspect, the organic chemical attractant is capable of attracting striped bass.

To date, a number of different types of scented lures have been disclosed and any known method or manner to provide a scented lure can be adopted and utilized with the fishing lures of the present invention. For example, the following scented lures are known in the art: lures formed from fish food which provides a scent to attract fish (U.S. Pat. No. 5,063,703 to Riley), lures formed of materials that have been intermixed with scents such as U.S. Pat. No. 4,953,319 to Kasper et. al. (a lure with a fish oil intermixed with the plastic formulation from which the lure made) and U.S. Pat. No. 4,875,305 to Bridges (a slowly dissolving lure made of a polymer with an fish scent attractant impregnated therein) and lures having inner receptacles containing scented substances or fluids such as U.S. Pat. No. 5,170,579 to Hollinger (a lure comprising a pouch for receiving bait or scented substances), U.S. Pat. No. 5,321,906 to Bommarito (a fishing scent delivery system comprising a bladder which releases a fishing scent material in the vicinity of a fishing lure) and U.S. Pat. No. 5,517,781 to Paoletta, Jr. (a lure having a reservoir from which a scented fluid is dispensed). Other types of scent bearing lures include those in which scent impregnated materials not integral to the lure structure are included, such as, U.S. Pat. No. 4,962,609 to Walker (a lure comprising an absorbent fibrous material impregnated with fish attractant), U.S. Pat. No. 5,018,297 to Kennedy, Jr. (a fishing lure with a cellular, porous scent receiving material inserted into a cylinder within the lure) and U.S. Pat. No. 5,142,811 to Freeman (a fishing lure having a fish attractant dispenser such as a scented pipe cleaner inserted into an inner casing). Each of the foregoing references is hereby incorporated by reference.

Accordingly, the scents and/or attractants can be combined together with a lure body embodiment of the invention by any known or suitable process, such as those described in the above mentioned references. For example, the scents and/or attractants may be applied on the surface of the lure body and/or the hook assembly at any suitable point in time, such as, for example, at the time of manufacturing of the lure or at the time of rigging the lure. The scents and/or attractants can also be embedded directly in the material used to form the lure body, e.g. mixed together with a liquefied polymer material used to form the lure body prior to pouring a mold for the lure.

The scent and/or attractant can also be combined with the lure body of the invention by way of exterior tabs, strips or foils which contain and release the scent and/or attractant and have the advantage that they can be replenished. Such tabs, strips and foils can be found in U.S. Pat. Nos. 6,827,930, 6,161,324, and 6,079,146, each of which are incorporated herein by reference.

Any suitable material can be used to manufacture or make the lure body of the fishing lures of the present invention. Most preferably, the lure bodies of the invention are constructed from a soft and/or pliable plastic or polymeric material through which a fishing hook can be inserted. Preferably, the plastics and/or polymeric materials used to construct the lure bodies of the invention are resilient, soft, flexible, and resistant to tearing from normal usage, including during fishing (e.g. when the fish are biting) and during the rigging process. Suitable "soft plastics" for use as starting materials can be found throughout the art. In addition, blends or mixtures of known plastic or polymeric starting materials can be mixed or blended to form a "blend" polymeric material for use in the invention.

Commonly known plastics and/or polymers that can be used to construct the lure bodies of the invention can include, but are not limited to, polystyrene, polyvinyl chloride, polyamide (or nylon), synthetic rubber, acrylic, polyethylene, polyfluorethylene, polypropylene, polyurethane, polyethylene terephthalate, polyester, dacron, terylene and the like or any combinations thereof Preferably, the plastics and/or polymers of the lures of the invention have soft, pliable, and penetrable properties and they are resistant to tearing.

Any suitable method known in the art for manufacturing the fishing lures of the invention, in particular, the preparation of the lure bodies, is contemplated. For example, the lure bodies of the invention can be prepared manually using molds into which hand-poured plastics and/or mixtures or blends of plastics, as described above, can be added and allowed to set or cure. In accordance with various embodiments, scent additives or decorative additives, such as, paints, glitter, etc., as described in more detail elsewhere herein, can be added to the plastics prior to adding the composition to the mold. In addition, the present invention contemplates any automated or semi-automated industrial process for making the lures of the invention, which utilizes any suitable machinery that is typical in the art of plastics, such as automated an injection molding machine, such as, for example, U.S. Pat. No. 4,444,711.

In another aspect, the fishing lures of the invention comprise one or more fishing hooks. The present invention contemplates any kind of suitable fish hook. It will be understood by the ordinary person skilled in the art that a fish hook has the following typical anatomy. The "front" of a typical fishing hook comprises a point, i.e. the sharpened tip of a fish hook which pierces the fish during the catch. Next, moving towards the "back" of the fish hook, i.e. in direction of the "eye" of the hook, is the barb. The fish hook then travels through a "bend" portion, which is a semi-circular looped region that turns back on itself. The bend moves into the "shank" portion, which is the substantially straight portion of the hook which the connects to the end of the fish hook, i.e. the "eye" of the hook. The eye is typically a looped eyelet which functions as a connection point or a fastener to join fish hook to the fishing line and/or leader device. These structures create several known dimensions of a fish hook that are defined here for convenience. The "gape" is the distance between the point and the shank. The "bite" or "throat" of the fishing hook as the distance from the apex of the bend to its intersection with the gape. The "front length" is the distance from the point to the apex of the bend. However, the invention is not limited to the traditional fish hook structure and contemplates any hook design that could be used with the fishing lures of the present invention. For example, some hooks may have an eye or like structure placed along the shank. Other hooks may have more than one barb or barb and point, etc. Still other hooks may have an eye or like structure in the form of a thread or crimp surface or the like.

In one embodiment, the fishing lures of the invention comprise a single hook, such as, a typical worm hook. The single hook of the present invention can be positioned anywhere in the body of the lure and in any orientation. For example, the single hook can be inserted through the distal, middle or proximal regions of the lure. Preferably, near the head region of the lure body and positioned such that the eye of the hook extends from the tip of the proximal end of the lure body to allow for a connection to a fishing line or other fishing device, such as a jig or leader line or a weight. Although a worm hook is preferably used, any type of single hook can be rigged to the lure bodies of the present invention. In addition, it will be appreciated that hook/lure glue can be used to secure the hook to the soft plastic lure bodies of the invention. Hook/lure glue is available and well-known in the art and can include, for example, Pro-Soft Worm Glue or the like. The application of such a glue is well within the skill set of the artisan.

One of ordinary skill in the art will readily appreciate that the term "rigging" may refer to the manner and way by which a hook is fastened to the body of a fishing lure, e.g. the soft plastic lure bodies of the invention, however, this definition is not intended to limit the scope of the subject invention in any way. It will be readily appreciated that the method of rigging a hook to the inventive lures can include where one or more hooks are placed or captured in the lure body during the manufacturing of the lure, e.g. the hooks are placed into position during the molding process such that the soft plastic body is formed around the hooks.

The hooks of the invention can be rigged or positioned in the lure such that the resulting hook(s) is in any suitable configuration, i.e. orientation or directionality of hook with respect to lure body and with other hooks if present. The hook point preferably faces towards the proximal end or the distal end of the lure body and the shank of the hook is substantially parallel or generally inline with the longitudinal axis of the lure body. No restriction, however, is placed on the orientation of the hooks of the invention so long as the objects and goals of the invention are not compromised.

In a preferred embodiment, the fishing lures of the present invention comprise at least two hooks. The hooks each can be in different overall orientations, i.e. the hook points can be pointing in the same direction, or facing one another, the shanks can be inline or out of line, the shanks can each be parallel to the longitudinal axis of the lure body or can have different angular relationships, etc. In addition, two or more different hooks can be used in the same lure, or the hooks can be identical.

In a preferred embodiment, the fishing lures of the invention comprise two hooks that are substantially inline along the longitudinal axis of the lure body, and have their points oriented in the same general direction, e.g. towards the proximal or distal ends of the lure body. In a further preferred embodiment, the hooks are substantially the same and the hook points are oriented towards the proximal end of the lure body.

In another preferred aspect, the invention provides a tandem hook assembly comprising a first hook and a second hook, wherein the end of the first hook, e.g. the first hook eye, is flexibly connected with the end of the second hook, e.g. the second hook eye. The end of the hook can also be referred to herein as the securement end. In this embodiment, the first hook and second hook can be the same hook or different hooks and can be made from the same or different materials and have the same or different weights. Upon rigging the tandem hook assembly on the lure bodies of the invention, the first hook towards the proximal end of the lure body and the second hook can be towards the distal end of the lure body, however, the invention is not limited to this configuration.

In another embodiment, the components of the hook assembly of the invention, including hooks, flexible connectors (e.g. fishing line or a leader), and fasteners (e.g. a crimp or clamp), are separately provided and assembled by a user, e.g. a fisherman during a fishing trip or in preparation thereof. In this manner, the end user, e.g. a fisherman, can prepare or assemble a hook assembly when desired and can select the particular components desired, such as, the particular style or weight of a hook, the particular type of flexible connector, such as, different fishing line weights, or a particular type of fastener to join the flexible connector to the one of more hooks.

The present invention contemplates that the flexible connector be any suitable flexible material that will tend not to snap or break during normal fishing use and can include, for example, fishing line or a metal or fiber leader.

Any suitable method for rigging the lures of the invention with one or more hooks is contemplated.

For example, the lures of the invention can be rigged with a single hook or single hook assembly. In one embodiment, a hook is inserted into the head region of the lure body and exits the lure about a quarter of an inch down the lure (any other suitable such distance is contemplated). The lure is then moved up the hook towards the shank and then rotated so that the lure is now 'locked' on the shank. The point of the hook can then be threaded back into the body of the lure to make the rig weedless, i.e. where the point of the hook is embedded in the lure body to avoid catching on water plant-life.

In another embodiment, a method of rigging a lure with two hooks or the tandem hook assembly of the invention is provided. In this aspect, a hook assembly is obtained, prepared (e.g. during a fishing expedition) or provided (e.g. commercial source) comprising a first hook and a second hook, said hooks being connected together at their ends by a flexible connector. The term "obtain" will be understood as referring to the manufacture, purchasing, or providing any aspect of the invention.

Next, a flexible elongate body is obtained, provided or prepared. The flexible elongate body preferably has a longitudinal axis and a general fish-like form and comprises a top longitudinal surface, a bottom longitudinal surface, a left wall surface, a right wall surface, a head region forming the proximal end, and a tail region forming the distal end, said head and tail regions being longitudinally opposed. Next, the second hook of the hook assembly is inserted through the tip of the proximal end and then fed out from the bottom longitudinal surface at a location that is in or substantially near the proximal end of the channel. Then, the first hook of the hook assembly is inserted through the tip of the proximal end and then partially out from the bottom longitudinal surface at a location that is in or substantially near the proximal end of the channel. The second hook is then inserted into the lure body through the distal end of the channel and then partially out from the bottom longitudinal surface at a location that is beyond the distal end of the channel. Lastly, the first and second hooks are adjusted so that they are in substantially the same orientation and the flexible connector traverses the channel.

In another embodiment, the present invention provides a method of rigging a fishing lure. The steps may include providing a hook assembly having a first hook and a second hook. The hooks can be connected by a flexible connector. The connection can be prepared by any suitable means and as described herein, such as, by a crimp, a clamp, a hook, a screw or any known connecting or joining device. Preferably, the joining device allows the flexible connector to remain flexible with respect to the hook. This aspect also may include the step of providing a flexible elongate body having a longitudinal axis, a distal end of the body, a proximal end of the body, and a bottom longitudinal surface having a channel. The channel preferably is positioned substantially near the head region or at the distal end and extends down the longitudinal axis of the body along the bottom longitudinal surface towards the proximal end. No limitation is placed on the length of the channel or its depth. The channel preferably extends from the distal end to at least the mid point of the body of the lure, however, the channel can be any length. Next, the second hook is fed, i.e. inserted, through the distal end of the elongate body and out from the bottom longitudinal surface. Preferably, the second hook is inserted at or near the tip of the distal end and exits out through or near the distal end of the channel. In a further aspect, the second hook may be pulled through or away from the lure body to advance the flexible connector through the lure body. The amount by which the flexible connector may be advanced through the lure is not limited to any particular length. Preferably, the flexible connector is advanced by at least 10%, 20%, 30%, 40%, 50%, 60%, 70%, 80%, 90% or 99% of its total length. In a preferred aspect, the flexible connector is advanced by at least ½ inch to 2 inches, and more preferably at least by 1 inch.

In a further aspect, the first hook can be fed or inserted through the distal end of the elongate body and partially out from the bottom longitudinal surface. The hook can be positioned in any general orientation with respect to the elongate body or other hooks if present. In one preferred aspect, the hook shank is substantially parallel with the longitudinal axis of the lure body and the point of the hook is facing towards the distal end. In another preferred aspect, the end of the first hook extends out from the tip of the proximal end so that it can be connected to a fishing line.

In yet a further aspect, the second hook can be fed or inserted through the elongate body and partially out from the bottom longitudinal surface at a location that is proximal to the first hook. In a preferred aspect, the second hook is inserted into the lure body at or near the proximal end of the channel. The hook can be positioned in any general orientation with respect to the elongate body or other hooks if present. In one preferred aspect, the hook shank is substantially parallel with the longitudinal axis of the lure body and the point of the hook is facing towards the distal end. The end of the hook can be positioned in the channel or in the lure body.

In a further aspect, the method of rigging a fishing lure includes the step of adjusting the first and second hooks so that they are substantially in line with the longitudinal axis of the elongate body.

The method of rigging can also include the step of applying glue to the lure to assist in the securement of the hooks to the lure body. It will be readily appreciated that lure glue, such as Pro-Soft Worm Glue, can be applied to the hooks and/or lure body to help prevent the lure body from slipping along the hooks.

The lures of the present invention can be used to fish any suitable target fish, such as, for example, striped bass (any geographical region), weakfish (e.g. Long Island, N.Y.), Musky and Northern Pike (e.g. Northern Maine), Mahi-Mahi (e.g. Florida), King Fish (e.g. Florida), Snook (e.g. Florida), Blue Fin Tuna (e.g. Massachusetts), Largemouth Bass (e.g. Florida or Massachusetts), and Bluefish (any geographical region).

The present invention contemplates any technique or fishing style that is suitable for use with the inventive lures. For example, the inventive lures can be fished with a traditional jerk approach. In this method, the rod tip is pointed towards the water and inventive lure is caused to twitch as the lure is reeled in using short jerking motions. A pause can be introduced in the reeling to simulate a substantially wounded bait fish. The retrieve speed of the reel can be changed and the twitching frequencies can be adjusted to facilitate a catch. With the "dead drift" technique, which can be used in areas with strong currents, the fishing line that is connected to the inventive lure comprises as little "belly" or slack in the line as possible while also letting the tide carry the lure. The lure can be caused to twitch as it begins to swing inwards towards the fisherman. With a "surface noise" technique, one fishes with tip of the rod up while employing a fast retrieve. Often, in very calm or slack water, this surface noise technique can be combined with a traditional jerk approach. This description of possible techniques is not meant to limit in any way the approach or style of fishing that may be employed by a fisherman with the lures of the present invention. Any technique is possible and the skilled artisan will have the capacity to select or use any suitable approach in the use of the lures of the invention.

The present invention further contemplates a package that comprises a fishing lure of the invention as described and claimed herein, along with suitable instructions for rigging the lure. The package may comprise any combination of one or more lure bodies, one or more hook assemblies, one or more decorations, and one or more attractants. The package can also include other features, such as, weights, jigs, leaders and fishing line, certain decorations, including, for example, rattles. In addition, the package can include a fishing lure glue, such as, Pro-Soft Worm Glue, which can be used to secure the hook assembly to the lure body so that the lure body does not slide along the hooks and/or flexible connector.

Specific embodiments of the invention are now described in relation to the drawings provided herein wherein like reference numbers identify similar structural features of various embodiments of the subject invention.

FIG. 1 depicts an embodiment of the hook assembly 100 in accordance with the present invention. In the embodiment shown, a lead hook 110 and a rear hook 120 are provided whose bends are longitudinally opposed to one another when their shanks are substantial parallel. The lead and rear hooks can be any suitable hook known in the art and thus, may vary with respect to the known structural features and dimensions of hooks described elsewhere herein, including, the shape, style and dimensions of the point, the barb, the bend, the shank, the eye, the gape, the bite (or throat), and the front length.

The first and second hooks of the hook assembly 100 are connected to a flexible connector 122 by crimp 124. While crimp 124 is depicted as the device or fastener by which the flexible connector is fastened to the end of the hooks, any suitable device, such as, a clamp, screw, latch, clip, clasp or hinge or the like, may be used to fastened or connect the flexible connector to the hook. The flexible connector can be made of any suitable material, such as, fishing line of any pound test, or any suitable type of flexible metal or composite wire or the like, or a polymer, such as, nylon. The flexible connector 122 preferably has flexible properties and is of a suitable thickness or diameter which is similar to the thickness or diameter of the hook cross-section. Where a crimp is used, the crimp can be made of any suitable material typically used to form a crimp, such as, for example a pliable and/or deformable metal or alloy such as, tin, brass, or stainless steel.

FIG. 1 depicts the lead and back hooks in a preferred orientation, wherein the flexible connector couples the two ends of the hooks such that the hooks as provided in the hook assembly prior to insertion into the lure body are oriented such that they are longitudinally opposed with opposite and longitudinally facing bends and points. Other orientations of the hooks are possible and are not meant to be limited by the appearance of FIG. 1.

Any suitable size hook and length of the flexible connector is contemplated. It will be readily appreciated that the size of the hooks and the length of the flexible connector can depend on the length of the lure body 210 as shown in FIG. 2 and/or the length of the lower channel 312 as shown in FIG. 4. For example, large gauge hooks may be preferred for longer lure bodies and smaller gauge hooks may be preferred for shorter length lure bodies. In addition, the length of the flexible connector can depend on the length of the channel used. In a preferred configuration, the flexible connector has a length that is substantially equivalent to the length of the lower channel.

Referring now to FIG. 2, a side-view of an embodiment of the fishing lure body 210 of the present invention. The lure body is provided with a top longitudinal surface 212, a bottom longitudinal surface 214, a left-side surface 216, a head region 220 forming the distal end and a tail region 230 forming the proximal end. The distal and proximal ends can have a tips 232 and 234, respectively, forming the longitudinal apices of the lure body. The head and tail regions are longitudinally opposed.

The lure body 210 can be made from any suitable material as described herein elsewhere, and preferably is a soft flexible plastic into which a hook can be inserted. The length of the lure body as measured from the tip of the proximal end to the tip of the distal end can be of any suitable length, for example, 7, 10 or 14 inches. No restrictions are to be placed on the particular length of the lure. The particular fishing conditions, technique used, or target fish, e.g. striped bass, may factor in determining the length of lure suitable for use in accordance with the invention.

The lure body 210 may comprise any suitable decoration, as described previously herein, which can include paint, patterns, lines, images, imitation scales, glitter, foil etc. any of which may aid the lure body in appearing more fish-like or which simply has a tendency to better attract a particular type of fish. A suitable decoration may also include any kind of appendage, such as a dangling piece of metal, shiny foil, or the like, which may assistant in attracting attention of fish.

The lure body 210 may also comprise one or more attractants, such as an animal-by product, plant by-product, or organic/inorganic scent as described herein previously which can aid in attracting or luring fish. In a particular aspect, the attractant is suitable for striped bass. As described previously, the attractant can be applied to the surface of the lure body, or be incorporated into the lure body at the time the lure body is manufactured, or it can be added to a surface of a lure in the form of an attachable strip and/or tab as described previously.

Referring now to FIG. 3, a front-end view of the lure body 210 along line 3-3 of FIG. 2, showing the top longitudinal surface 212, bottom longitudinal surface 214, the left surface 216, the right surface 218, an upper channel 310 and a lower channel 312. The left and right surfaces are based from the perspective of the lure itself.

FIG. 4 depicts a partial cross-sectional view of the lure body 210 showing the lower channel 312 and the upper channel 310 taken along line 4-4 of FIG. 3. The lower channel 312 preferably runs parallel along the longitudinal axis of the lure body and has a proximal end which is closest to the head region 220 and a distal end which is closest to the tail region 230. The lower channel 310 can be of any suitable length and be positioned at any suitable location along the bottom longitudinal surface, and preferably at the longitudinal axis of the lure body, i.e. the center line of the lure body. Preferably, the lower channel begins at the head portion and extends along the longitudinal axis of the lure body to about the mid-point of the lure body. However, no limitation is placed on the length of the channel or its position along the lure body. In addition, the depth of the lower channel can be any suitable depth, including a depth which is equivalent to about 10%, 20%, 30%, 40%, 50%, 60%, 70%, 80%, or 90% of the thickness of the lure body. Most preferably, the lower channel depth is about 20%-60% of the thickness of the lure body. The depth may be constant over the length of the channel or it may vary.

The lure body 210 can also have an upper channel 310 which can assist in the swimming behavior of the lure body in the water. The upper channel can be of any suitable length with respect to the length of the lure body, including, for example, run the whole length of the lure from the head portion to the tail portion. The upper channel may be any suitable depth, including a depth is equivalent to about 10%, 20%, 30%, 40%, 50%, 60%, 70%, 80%, or 90% of the thickness of the lure body. Most preferably, the upper channel depth is about 5-20% of the thickness of the lure body. The depth may be constant over the length of the channel or it may vary.

FIG. 5 and FIG. 6 are operational views of the fishing lure of the present invention showing the insertion of the hook assembly 100 into the lure body 210. The rear hook 120 is inserted through the tip of the head region (i.e. the tip or end of the proximal end) and fed through such that the point exits from the bottom longitudinal surface of the lure body. The lure body can be affixed with a marker, such as a divet, or color, or the like, in order to show the location for inserting the point of the hook or the position at which the point of the hook showed exit the body. FIG. 6 depicts that the rear hook fully exits the lure body and is pulled such that a portion of the length of the flexible connector is advanced through the lure body. Preferably, the rear hook exits out from the distal end of the lower channel. The front hook is then shown in FIG. 6 to be inserted into the tip of the distal end and fed through such that the point of the hook exits the bottom longitudinal surface.

FIGS. 7A and 7B are two different embodiments possible for the final position of the hook assembly of the invention in the lure body of FIG. 4. In FIG. 7A, the front hook and rear hook shanks are substantially aligned with the longitudinal axis of the lure body. The hook points exit out the bottom longitudinal surface and are oriented towards the proximal end of the lure body. The eye or securement end of the front hook 110 extends partially from the tip of the proximal end with a sufficient exposure so that the eye can be linked or tied, i.e. secured, to a fishing line. The flexible connector 122 preferably runs parallel to the shank of the front hook, enters or is accommodated by the lower channel. The end of the rear hook 120 can be contained in the lower channel, as shown in FIG. 7A, or it can be position inside the body of the lure, as shown in FIG. 7B. The position of the hook end is not meant to be limited to the embodiments of FIGS. 7A and 7B. The rear hook is positioned in the lure body, wherein the hook point exits the bottom longitudinal surface and extends back towards the distal end of the lure body and towards the front hook. The extent to which the front and rear hooks emerge out from the bottom longitudinal surface is not meant to be limited by the figures, and can be any suitable depth or distance.

For example, the points of the hooks can be containing wholly inside the body of the lure, i.e. a "weedless" style rig, whereby the fishing lure can avoid being snagged on weeds and debris the water. In addition, one of the two hooks can be concealed inside the body of the lure, e.g. the rear hook. Preferably, the bend of the front hook is positioned at or near the distal end of the lower channel. In addition, it is preferred that the securement end of the rear hook is positioned at or near the end of the proximal end of the lower channel and can be contained in the channel as in FIG. 7A or inside the lure body as in FIG. 7B.

FIG. 8 is an enlarged view of the head region taken along line 8-8 of FIG. 7A and FIG. 7B. The figure shows the positioning of the front hook of the invention in the lure body at the end of insertion. The figure shows that the eye 810 of the hook is extended from the distal end portion of the lure body such that it is available for securement to a fishing line. The figure also depicts that the flexible connector 122 and the crimp 124 are substantially parallel to the shank of the front hook 110 and that the flexible connector 122 passes into the lower channel.

Although the device of the subject invention has been described with respect to preferred embodiments, those skilled in the art will readily appreciate that changes and modifications may be made thereto without departing from the spirit and scope of the subject invention as defined by the appended claims.

The invention claimed is:

1. A method of rigging a soft plastic jerk bait comprising the steps of:
   (a) providing a hook assembly having a first hook and a second hook, each hook having an eye at one end and a point at another end, said first and second hook being connected to one another at their eyes by a flexible connection means;
   (b) providing a flexible elongate body having a longitudinal axis, a head region forming a distal end of the body, a tail region forming a proximal end of the body, a left wall surface, a right wall surface, a top longitudinal surface, and a bottom longitudinal surface having a channel, said channel having a distal and a proximal end;
   (c) feeding the point of the second hook through the distal end of the elongate body and out from the channel of the bottom longitudinal surface;
   (d) advancing the second hook to draw a portion of the flexible connection means through the distal end;
   (e) feeding the point of the first hook through the distal end of the elongate body and partially out from the channel of the bottom longitudinal surface such that the shank of the hook is embedded in the body and oriented in generally parallel relation with the longitudinal axis of the body, said first hook point facing the head region; and
   (f) feeding the point of the second hook through the elongate body at the proximal end of the channel and partially out from the bottom longitudinal surface such that the shank of the second hook is embedded in the body and oriented in generally parallel relation with the longitudinal axis of the body, said second hook point facing the head region and being generally aligned with the first hook point, wherein the flexible connection means is positioned in the channel.

2. The method of rigging a fishing lure of claim 1, wherein the step of connecting the eyes of the first and second hooks to the flexible connection means is carried out using a crimp.

3. The method of rigging a fishing lure of claim 1, wherein second hook is positioned at the proximal end of the channel such that the eye of the second hook extends into the channel from the elongate body at the proximal end of the channel.

4. The method of rigging a fishing lure of claim 1, wherein the the eye of the second hooks is embedded in the elongate body beyond the proximal end of the channel.

5. The method of rigging a fishing lure of claim 1, further comprising the step of applying glue to secure the hook assembly to the elongate body.

* * * * *